(12) United States Patent
Dussol et al.

(10) Patent No.: US 10,881,112 B2
(45) Date of Patent: Jan. 5, 2021

(54) SOFT CAKE AND METHOD OF MANUFACTURE THEREOF

(71) Applicant: Generale Biscuit, Clamart (FR)

(72) Inventors: Jean Maurice Dussol, Clamart (FR); Laurent Fiot, Clamart (FR); Denis Pujo, Clamart (FR)

(73) Assignee: Generale Biscuit, Clamart (FR)

( * ) Notice: Subject to any disclaimer, the term of this patent is extended or adjusted under 35 U.S.C. 154(b) by 0 days.

(21) Appl. No.: 15/550,739

(22) PCT Filed: Feb. 18, 2016

(86) PCT No.: PCT/EP2016/053422
§ 371 (c)(1),
(2) Date: Aug. 11, 2017

(87) PCT Pub. No.: WO2016/131902
PCT Pub. Date: Aug. 25, 2016

(65) Prior Publication Data
US 2018/0027822 A1 Feb. 1, 2018

(30) Foreign Application Priority Data
Feb. 18, 2015 (EP) .................................... 15305244

(51) Int. Cl.
*A21B 3/13* (2006.01)
*A21D 13/47* (2017.01)
(Continued)

(52) U.S. Cl.
CPC .............. *A21B 3/132* (2013.01); *A21B 3/135* (2013.01); *A21B 3/138* (2013.01); *A21B 3/18* (2013.01); *A21D 10/04* (2013.01); *A21D 13/47* (2017.01)

(58) Field of Classification Search
CPC ... A21B 3/13; A21B 3/131–135; A21B 3/138; A23P 30/10; A21D 10/04;
(Continued)

(56) References Cited

U.S. PATENT DOCUMENTS 5,131,320 A * 7/1992 Jensen ................. A47J 37/067
99/376
5,215,774 A * 6/1993 Moder ................... A21D 10/00
426/243
(Continued)

FOREIGN PATENT DOCUMENTS

CN          1108960         9/1995
CN          2296113         11/1998
(Continued)

OTHER PUBLICATIONS

International Search Report, dated Mar. 24, 2016 for International Application No. PCT/EP2016/053422 (3 pgs.).
(Continued)

*Primary Examiner* — Drew E Becker
*Assistant Examiner* — Bryan Kim
(74) *Attorney, Agent, or Firm* — Fitch, Even, Tabin & Flannery, LLP

(57) ABSTRACT

The present invention relates to a method for the production of a soft cake having at least a molded face and at least a non-molded face, the molded face having at least one molded three-dimensional pattern, the method comprising the steps of: a) pouring a cake batter suitable for forming a soft cake into a pan, wherein the cake batter has a viscosity of between 500 and 1 Pa·s; b) baking said soft cake batter in said pan to form a soft cake; and c) removing the soft cake from the pan, wherein the pan has a molded inner surface for receiving the cake batter and which provides the three dimensional molding pattern of the soft cake, and wherein
(Continued)

the molded inner surface of the pan has an arithmetical mean degree of roughness (Ra) of from 0.12 μm to 0.22 μm, wherein the molded three-dimensional pattern of the soft cake is complementary to the molded inner surface of the pan and has a molded groove which is in recess relative to said molded face and/or a molded ridge which protrudes relative to said molded face, said molded groove and/or molded ridge having a minimum width of less than 4 mm measured across the groove or ridge at the maximum depth or height respectively.

15 Claims, 6 Drawing Sheets

(51) Int. Cl.
*A21B 3/18* (2006.01)
*A21D 10/04* (2006.01)

(58) Field of Classification Search
CPC ........ A21D 10/045; A21D 13/47; A21D 8/00; A21D 8/06; A21D 8/08; A21D 13/44; A21D 13/80; A23L 5/10; A23L 5/13; A23L 5/15; A23L 5/17; A23L 5/34; B41D 3/00; B41D 3/02; B41D 3/04; B41D 3/08; B41D 3/12; B41D 3/14; A23B 3/18; A47J 36/02; A47J 36/022; A47J 36/025; A47J 36/027; A47J 36/04; A47J 36/42; A47J 37/01; A47J 37/10; A47J 37/108; B65D 81/34; B65D 81/3407; B65D 81/343

See application file for complete search history.

(56) References Cited

U.S. PATENT DOCUMENTS

| | | | | |
|---|---|---|---|---|
| 5,776,534 A * | 7/1998 | Christensen | ......... | A21C 11/163 264/176.1 |
| 5,843,512 A * | 12/1998 | Daouse | ..................... | A23G 1/21 426/512 |
| 6,627,239 B1 * | 9/2003 | Gavie | ..................... | A21B 3/131 249/119 |
| 6,632,493 B1 * | 10/2003 | Hildebrand, IV | ... | B65D 1/0215 222/206 |
| 6,667,084 B2 * | 12/2003 | Brand | ..................... | A47J 36/02 428/35.7 |
| 6,818,242 B2 * | 11/2004 | Sada | ..................... | A23L 5/11 426/506 |
| 6,942,885 B2 * | 9/2005 | Ross | ..................... | A21D 10/025 426/128 |
| 7,100,498 B2 * | 9/2006 | Morgan | ..................... | A21B 3/13 99/428 |
| 7,201,358 B2 * | 4/2007 | Nichols | ..................... | A21B 3/13 220/573.1 |
| 7,410,606 B2 * | 8/2008 | Appleby | ..................... | B23P 15/246 264/219 |
| 8,968,810 B2 * | 3/2015 | Greenberg | ..................... | A21D 13/24 426/389 |
| 9,155,314 B2 * | 10/2015 | Deroulers | ..................... | A21B 3/138 |
| 2003/0031770 A1 | 2/2003 | Sada | | |
| 2003/0126996 A1 * | 7/2003 | Cheng | ..................... | A47J 37/10 99/422 |
| 2004/0182989 A1 * | 9/2004 | De Buyer | ..................... | A21B 3/132 249/127 |
| 2005/0095334 A1 * | 5/2005 | Messina | ..................... | A21C 11/08 426/512 |
| 2005/0211101 A1 * | 9/2005 | Finnie, II | ..................... | A21B 3/132 99/279 |
| 2005/0247212 A1 * | 11/2005 | Meeks | ..................... | A21B 3/136 99/426 |
| 2007/0284505 A1 * | 12/2007 | Kaposi | ..................... | A21B 3/136 249/144 |
| 2008/0216670 A1 * | 9/2008 | Schuler | ..................... | A21B 3/138 99/427 |
| 2008/0274243 A1 * | 11/2008 | Fang | ..................... | A21B 3/13 426/389 |
| 2009/0114796 A1 * | 5/2009 | Lin | ..................... | A21B 3/13 249/134 |
| 2010/0276432 A1 * | 11/2010 | Huo | ..................... | A47J 36/02 220/573.2 |
| 2011/0223300 A1 * | 9/2011 | Purgatorio | ..................... | A47J 39/006 426/418 |
| 2015/0056337 A1 * | 2/2015 | Fahey-Burke | ..................... | A21D 15/02 426/95 |
| 2015/0181892 A1 * | 7/2015 | Mcmunn | ..................... | A21B 3/132 426/304 |
| 2015/0327709 A1 * | 11/2015 | Peers | ..................... | A23P 30/10 426/389 |

FOREIGN PATENT DOCUMENTS

| | | |
|---|---|---|
| CN | 1531854 | 9/2004 |
| CN | 1671775 | 9/2005 |
| CN | 201146773 | 11/2008 |
| CN | 104066336 | 9/2014 |
| CN | 303028414 S | 12/2014 |
| CN | 105163592 | 12/2015 |
| EP | 1535953 | 6/2005 |
| JP | 2009172847 | 8/2009 |
| WO | 2014177390 | 11/2014 |
| WO | 2014177391 | 11/2014 |

OTHER PUBLICATIONS

Mintel, "Butter Biscuits", Oct. 30, 2011 (3 pgs.).
Mintel, "Strawberry Sponge Cakes", Jan. 31, 2015 (3 pgs.).
Extended European Search Report dated Feb. 22, 2019 for European Patent Application No. 19151922.2 (10 pgs.).
Ma, Lin, "Yummy Cake Cooking", Hunan, Science & Technology Press, Nov. 30, 2014, p. 115 (2 pgs.).
Mintel "Canele de Bordeaux", May 1999 (1 pg.).
Mintel "Thin Wafers with Raspberry Filling", Sep. 2012 (3 pgs.).
Mintel, "Baked Confectionery Product With Chocolate Filling", Dec. 2014 (3 pgs.).
Notification of the First Office Action, dated Dec. 31, 2019 for Chinese Patent Application No. 201680006452.8, with English translation (14 pgs.).
Office Action dated May 7, 2007 for Russian Patent Application No. 2017125959 with English translation (8 pgs.).

* cited by examiner

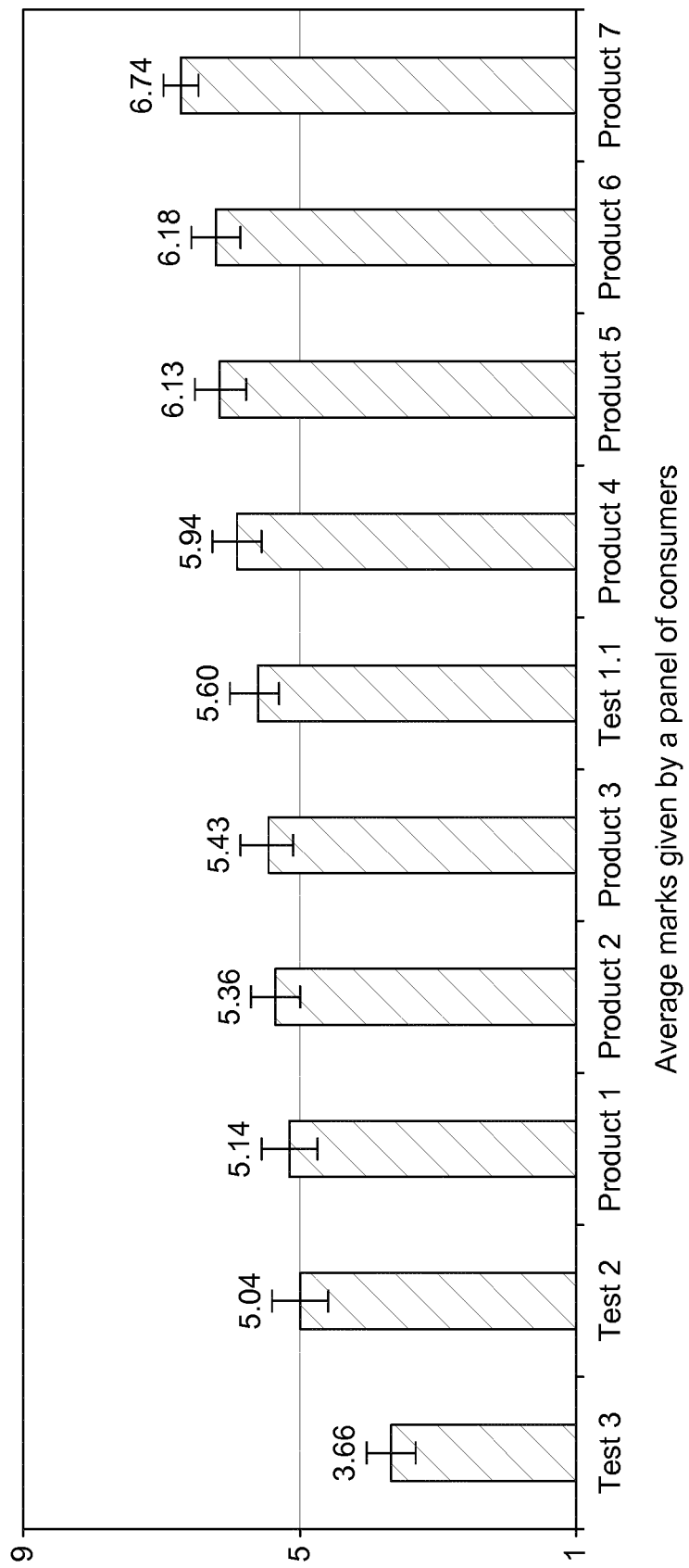

SOFT CAKE AND METHOD OF MANUFACTURE THEREOF

CROSS REFERENCE TO RELATED APPLICATIONS

This application is a U.S. national phase application of International Application No. PCT/EP2016/053422, filed Feb. 18, 2016, which claims benefit from European Application 15305244.4, filed Feb. 18, 2015, which are each hereby incorporated herein by reference in their entirety.

FIELD

The present application relates to the field of soft cakes. In particular, the present application relates to soft cakes baked in a molding pan with at least one molded three dimensional pattern and/or shape. The present application also relates to methods for producing a soft cake according to the present invention.

BACKGROUND

Soft cakes result from compositions and processes which are numerous and stem from centuries of baker's practice and regional inputs. The typical ingredients used for preparing a soft cake are cereal material (usually wheat flour), egg, fat (usually butter or oil), sugar and leavening agent.

Soft cakes can, for instance, be baked in a pan and or on a plane surface. Typically, a soft cake baked in a pan is prepared by mixing a batter composed of the typical ingredients mentioned above, then pouring the batter into a pan and baking it. The soft cake so obtained has roughly the same shape as the pan.

Colour and shapes have been long studied in marketing science and are well known to be decisive in the purchase behaviour of consumers. However, although the overall appearance of soft cakes is critical, since it draws the consumer's attention to the product, the nature of soft cakes make them difficult to mold with fine details.

Indeed, as the soft cake batter develops during baking thanks to the leavening agents, it forms baked soft cakes having a highly aerated structure, and this type of structure is difficult to mold into refined shapes with fine details. Moreover, because soft cakes molding pans are generally made from embossed steel sheets, the definition of their finest details is limited to dimensions of more than 4 mm, which does not enable fine forms and details.

In order to obtain soft cakes bearing such fine details, one may initially think of modifying the soft cake batter recipe so that the soft cake structure is less aerated, for example by decreasing the quantity of leavening agent. However, decreasing the aeration of the baked dough would reduce the soft cake volume and would result in a poor appearance of the soft cakes. It would also impact the softness of the baked product, as softness is directly correlated to the aeration of the dough for a given recipe. All these drawbacks would lead to a reduction in consumer appeal of the soft cake.

As a result, it is not currently possible to achieve a high level of details in the pattern shape of current soft cakes.

In order to overcome this technical issue, another solution is to decorate the soft cake after baking, to make it more attractive and facilitate differentiation of the soft cake by consumers. Many different methods of post-baking decoration are known from the literature or are routinely used for soft cakes available on the market.

However, none of the above solutions enables a soft cake taken out of the pan without further post-depanning steps to bear the same definition as those which can be achieved with a dry biscuit. Indeed, the more complex shapes that are available on the market do not have fine details, and in particular details of less than 4 mm, on their molded face.

Lu produce a bakery product known as "Le Veritable Petit Beurre" with fine surface markings provided within a biscuit. However, such a biscuit product is not a soft cake and so the difficulties associated with forming sharp fine features do not arise.

Lu also produce a bakery product called Lulu L'Ourson Gateau Moelleux Fourres which is a soft cake product in the shape of a bear. Although the surface of the bear has changes of angle, it does not have any ridges or grooves as described herein.

JP2009172847 discloses a method for the blow-moulding of a plastic article.

EP1535953 discloses an embossed metal sheet coated with a surface-roughened resin film.

US20030031770 discloses a production method for Chinese fried meat dumplings.

WO2014177391 discloses a method for making a soft cake batter.

There is, therefore, a need for a method to produce finely molded soft cakes, particularly of the type with at least a molded face and at least a non-molded face, wherein the molded face has at least one molded three dimensional pattern with fine details.

More specifically, there is a need for soft cakes having a high definition design while retaining the organoleptic properties of a conventional soft cake, so as to remain acceptable for the consumer.

Accordingly, it is desirable to provide a soft cake having a high definition design and a method for making the same and/or to tackle at least some of the problems associated with the prior art or, at least, to provide a commercially viable alternative thereto.

SUMMARY

According to a first aspect there is provided a method for the production of a soft cake having at least a molded face and at least a non-molded face, the molded face having at least one molded three-dimensional pattern, the method comprising the steps of:
  a) pouring a cake batter suitable for forming a soft cake into a pan, wherein the cake batter has a viscosity of between 500 and 1 Pa·s;
  b) baking said soft cake batter in said pan to form a soft cake; and
  c) removing the soft cake from the pan,
wherein the pan has a molded inner surface for receiving the cake batter and which provides the three dimensional molding pattern of the soft cake, and wherein the molded inner surface of the pan has an arithmetical mean degree of roughness (Ra) of from 0.12 μm to 0.22 μm,
wherein the molded three-dimensional pattern of the soft cake is complementary to the molded inner surface of the pan and has a molded groove which is in recess relative to said molded face and/or a molded ridge which protrudes relative to said molded face,
said molded groove and/or molded ridge having a minimum width of less than 4 mm measured across the groove or ridge at the maximum depth or height respectively.

According to a second aspect there is provided a soft cake having at least a molded face and at least a non-molded face, the molded face having at least one molded three-dimensional pattern, said three dimensional pattern comprising at least a molded groove which is in recess relative to said molded face and/or a molded ridge which protrudes relative to said molded face, said molded groove and/or molded ridge having a minimum width of less than 4 mm measured across the groove or ridge at the maximum depth or height respectively.

The present invention will now be further described. In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

BRIEF DESCRIPTION OF THE DRAWINGS

The invention will now be described in relation to the following non-limiting figures, in which:

FIG. 5 shows the marks obtained for several cakes tested by a panel of consumers for their texture. Three types of soft cakes, realized with different soft cake batter recipes (Test 1, Test 2, Test 3) and the method described herein, were tasted along with 7 products (Products 1 to 7) currently available on the market. Values indicated correspond to the mean of marks given by consumer for the texture of the products.

DEFINITIONS

Figure 1:
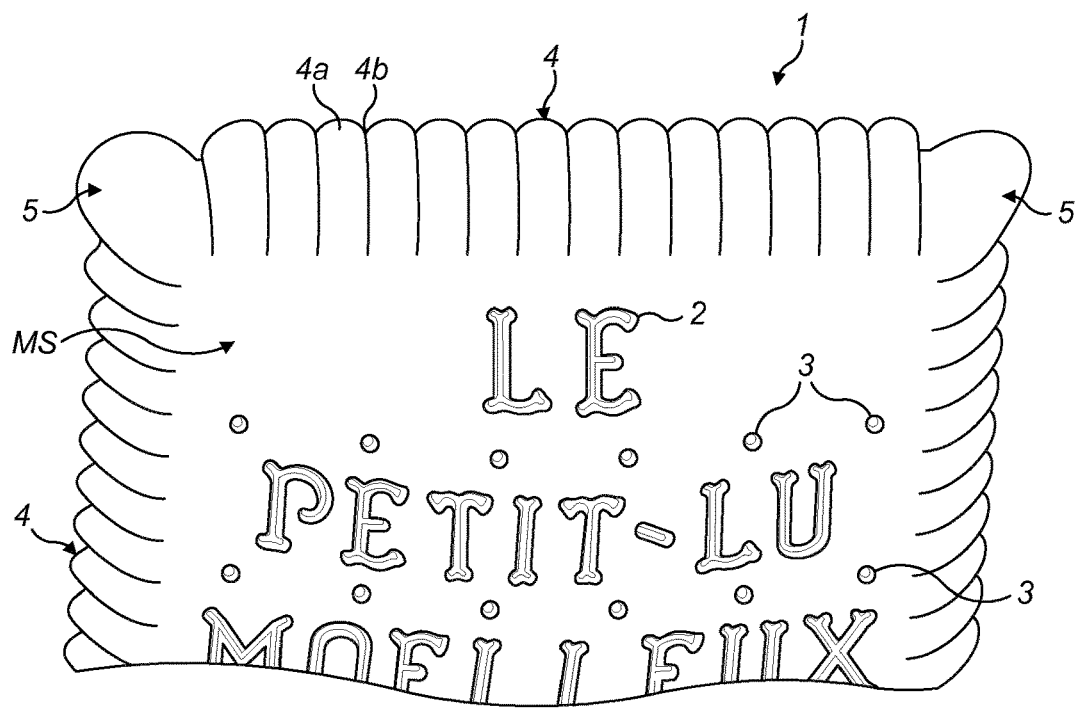
FIG. 1 represents a soft cake comprising a molded three dimensional pattern according to a possible embodiment of the invention.

The term "soft cake" means a soft sweet or savoury food made from a mixture of flour, water, and other ingredients such as sugar, eggs and fat. The soft cake is baked and sometimes iced or decorated. A soft cake presents a crumb texture. Preferably, no yeast is used in soft cakes for soft cake expansion; instead, if needed only chemical leavening agents are used. Examples of "soft cakes" include angel cakes, shortened cakes, butter cakes, sponge cakes, yellow layer cakes, white layer cakes, cupcakes, pound cakes (including quatre-quarts), chiffon cakes, roulades, genoises, madeleines, muffins, Christmas cakes, etc.

Soft bakery products are characterised by a soft or tender texture. That is, soft bakery products are not crispy or crunchy. Soft bakery products often have an intermediate or high level of water activity (Aw), as discussed below.

Conventional biscuits, which typically contain little moisture, have a crispy texture contrasting with that of a soft bakery product.

The shelf-life of a "soft cake" is generally longer than about 4 months, preferably longer than about 6 months, more preferably from about 6 to about 12 months at ambient temperature.

By "soft cake with at least a molded face and at least a non-molded face", it is meant herein a soft cake cooked in an "open pan". By "open pan", it is meant herein a pan having at least one face which is open, i.e. that when a batter is present in the pan, its upper face is not covered by the pan. In other words, an open pan does not comprise any lid on its upper face or side.

By "molded face", it is meant herein a part of the cake surface that is in contact with the inner surface of the pan during baking. Thus, the molded face takes the complementary shape of the inner surface of the pan. "The molded face presents" or "the molded face presenting" means "the molded face has at least on a part thereof" or "the molded face having at least on a part thereof".

By "molded three dimensional pattern", it is meant herein any type of shape and/or pattern which is in recess or which protrudes from a molded face.

According to the present invention, "batter" means a semi-liquid to liquid mixture of flour, water, and other ingredients that can be poured.

GENERAL DESCRIPTION OF THE INVENTION

The disclosure provides a method for the production of a soft cake. The soft cake which is produced has a three-dimensional pattern molded on the molded face. The pattern has a molded groove which is in recess relative to said molded face and/or a molded ridge which protrudes relative to said molded face, said molded groove and/or molded ridge having a minimum width of less than 4 mm measured across the groove or ridge at the maximum depth or height respectively. By minimum width it is meant that the width of at least a portion of the groove or ridge satisfies the requirement.

The width of the molded groove or ridge represents the level of high definition patterning which can be achieved with the method and pan described herein. Preferably the molded ridge or molded groove has a minimum width of less than 3 mm, more preferably less than 2 mm, yet more preferably less than 1 mm, and even more preferably about 0.5 mm. Typically the finest level of detail that can be achieved is a minimum width of at least 0.4 mm. Alternatively the minimum width may be from 3 mm to 1 mm.

Preferably said molded groove and/or molded ridge has a depth or height respectively of from 1 to 5 mm, more preferably from 2 to 4 mm. The typical soft cake product has a thickness of from 2 to 5 cm, such that a groove of this dimension does not compromise the products integrity.

Preferably said molded groove and/or molded ridge has a length of at least 0.4 mm, more preferably at least 0.5, and most preferably at least 2 mm. As will be appreciated, there is no upper limit to the length of a groove or ridge that can be provided on a surface, except that defined by the limitations of the surface size.

Preferably said molded groove and/or molded ridge has a substantially constant depth and preferably extends over a length of at least 5 mm.

Figure 3:
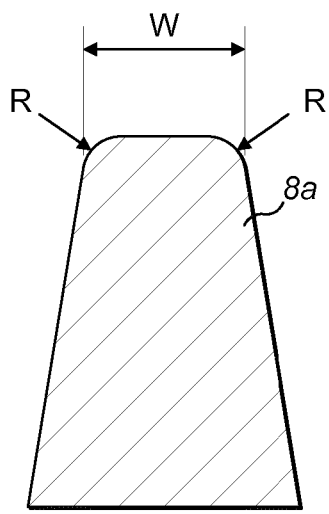
FIG. 3 is a section view of a detail of a three dimensional pattern of the molding pan of FIG. 2.

In some embodiments, the molded groove and/or molded ridge will form a pit or pedestal, such that the length substantially matches the width. Such features are useful for the decoration of soft cake products as shown in FIG. 3.

Preferably the molded face of the soft cake includes a substantially planar region within which the molded ridge and/or molded groove are provided.

More specifically, the groove may be in the form of a channel formed in a flat surface of the soft sake product. The channel preferably has a flat base portion running along within the channel which is in a plane parallel to a plane of the surface of the biscuit. The walls of the channel are preferably of substantially constant separation or may taper towards the flat base portion. The minimum width is preferably a constant width measured across the flat base portion. As will be appreciated, the foregoing applies in an inverted form to a ridge in the soft cake, such that it has a flat summit along the ridge which is in a plane parallel to a plane of the surface of the biscuit.

The soft cake is made from a conventional soft-cake batter, such as is well known in the art. Advantageously, said method comprises a step of preparing the soft cake batter before step a).

The viscosity of the soft cake batter is important because it has to be sufficiently liquid to fill completely into the pan, such that it fills entirely around ridges and into grooves in the pan. The cake batter has a viscosity of between 500 and 1 Pa·s. Viscosity is measured at the filling temperature which will be from 20 to 30° C., preferably from 25 to 28° C. Viscosity for such a soft cake batter is effectively measured using a Brookfield RVDV-II+ viscometer, using a spindle no. 6 at a speed of 25 RPM.

Preferably the soft cake batter has a viscosity of preferably between 250 and 1 Pa·s., more preferably between 150 and 1 Pa·s. In particular, the soft cake batter can have a viscosity comprised between about 500 Pa·s and about 10 Pa·s, preferably between about 250 Pa·s and about 20 Pa·s, more preferably between 150 Pa·s and 30 Pa·s.

The cake batter may be aerated before filling into the mold to provide a lighter final product. Preferably the cake batter has a density of from 0.6 to 1.2 g/cm$^3$, more preferably from 0.8 to 1 g/cm$^3$.

The soft cake batter is poured into a pan in step a). The pan is provided with a molded inner surface for receiving the cake batter. That is, the pan forms a container for holding an amount of cake batter, such as with retaining sides. The molded inner surface of the pan provides a three dimensional molding pattern to shape the soft cake batter before baking to form the soft cake. The three-dimensional molding pattern will be complementary to the pattern on the final cake. That is, the mold and the molded cake surface will match and can be exactly interlocked. As a consequence, the discussion herein of dimensions for the ridge or groove in the mold apply equally to a groove or ridge in the molded soft cake surface respectively.

The molded inner surface of the pan has an arithmetical mean degree of roughness (Ra) of from 0.12 μm to 0.22 μm. Preferably, the pan has an arithmetical mean degree of roughness of between 0.14 μm and 0.20 μm. More preferably the inner surface of the pan has an arithmetical mean degree of roughness (Ra) of from 0.16 μm to 0.18 μm. Such roughness may for instance be obtained with a sanded matrix or a sanded punch.

Preferably the pan is an open pan, i.e. the upper part of the pan is not covered with a lid. As a consequence, the volume of dough baking in an open pan is not constricted.

Preferably at least the inner surface of the pan is formed of plastic or silicone, preferably silicone. Preferably the pan has a wall-thickness of less than 1 mm, preferably about 0.5 mm. Preferably the pan is made of plastic or silicone, preferably heat-resistant plastic or heat-resistant silicone. By "heat-resistant plastic", it is meant herein plastic that is not transformed when stored at between 100 and 300° C. for 4 hours. By "heat-resistant silicone", it is meant herein silicone that is not transformed when stored at between 100 and 300° C. for 4 hours.

Classically, pans are greased before being filled with batter, in order to ease the removing of the cake from the pan after baking. One of the many advantages of the method of the invention resides in that the combination of the soft cake butter and of the pan of the invention facilitates the removing of the cake from the pan. Preferably the method does not involve a step of pre-greasing the inner surface of the pan before the cake batter is poured into the pan. That is, there is no separate step of applying grease or fat to the pan ("greasing agents"). The inventors have found that, by providing a surface texture on the pan, an amount of grease from the preceding cake batter can be retained which has a lubricating effect for the next batch. Therefore, the term "greasing agents" is not intended to cover the ingredients of the soft cake batter when it is loaded into the pan.

Interestingly, the inventors have observed that the absence of greasing agents actually contributes to improving the quality of the details of the molded three dimensional patterns. Without being bound by theory, it is very likely that, during backing, grease boiling produces a micro frying phenomenon, which can be detrimental for any precise detail of the soft cake shape.

Since the fats in the batter have an effect on the release from the pan, preferably the cake batter comprises at least 10 wt. % of fat, preferably at least 15 wt. % of fat, and more preferably at least 20 wt. % of fat. Ingredients for the cake batter are discussed in more detail below.

Once the soft cake batter is poured into the pan it is baked under conventional baking conditions. The baking of step b) does not require an investment in special equipment, and is performed using any type of baking goods, that is to say any type of oven. Conventional ovens are generally ovens that can be used to bake a multitude of products (i.e. bread, cakes, pies, cookies, etc.). These ovens are of different configurations for commercial or home use, but they all have an enclosed baking chamber wherein appropriate temperatures can be reached. Preferably, the oven according to the invention is a convective, conductive, radiative or combined oven.

Usual baking conditions, i.e. time and temperatures, generally appropriate for baking soft cakes and well known from the person in the art can be used to bake the soft cakes of the invention. For example, the soft cake of the invention may be baked from 5 to 60 minutes, and for instance at 100 to 300° C.

The baked cake is then removed from the pan. Removing of the cake from the pan can be achieved by any routine technic known from the person in the art, such as for instance removing the cake using a needle ("needle removal"), removing the cake using an aspiration sucker ("aspiration sucker removal"), removing the cake by flipping and hitting the tray, removing the cake by flipping the tray and pushing products from the bottom of the pan.

Once the pan is empty the pan can be reused.

The method can comprise a further step of packing the soft cake obtained after the step of baking. In particular, the method can include a further step of packing the soft cake in an appropriate packaging after the step of the removing of the cake from the pan.

A preferred embodiment of the first aspect includes a method for the production of a soft cake with at least a molded face and at least a non-molded face, the molded face having at least one molded three dimensional pattern, said three dimensional pattern comprising at least a molded groove or a molded ridge which is in recess or which protrudes relatively to said molded face, said molded groove or molded ridge having a width of less than 4 mm, preferably less than 3 mm, preferably less than 2 mm, more preferably less than 1 mm, and even more preferably about 0.5 mm, said width being measured perpendicularly to the direction in which the molded groove or the molded ridge is in recess or protrudes relatively to the molded face, comprising the steps of:
- a) pouring soft cake batter having a viscosity between 500 and 1 Pa·s preferably between 250 and 1 Pa·s., more preferably between 150 and 1 Pa·s. into a pan with an inner surface having at least one molded three dimensional pattern with a definition of less than 4 mm, preferably less than 3 mm, preferably less than 2 mm, more preferably less than 1 mm, and even more preferably about 0.5 mm, wherein the inner surface of the pan has a degree of roughness comprised between an arithmetical mean roughness Ra of between 0.12 μm and 0.22 μm, of between 0.14 μm and 0.20 μm, of between 0.16 μm and 0.18 μm.
- b) baking said soft cake batter in said pan;
- c) the removing of the cake from the pan; and
- d) optionally repeating step a) to c)

A preferred embodiment of the first aspect includes a method for the production of a soft cake having at least a molded face and at least a non-molded face, the molded face having at least one molded three-dimensional pattern,
the method comprising the steps of:
- a) pouring a cake batter suitable for forming a soft cake into a pan, wherein the cake batter has a viscosity of between 500 and 1 Pa·s;
- b) baking said soft cake batter in said pan to form a soft cake; and
- c) removing the soft cake from the pan,
wherein the pan has a molded inner surface for receiving the cake batter and which provides the three dimensional molding pattern of the soft cake, and wherein the molded inner surface of the pan has an arithmetical mean degree of roughness (Ra) of from 0.12 μm to 0.22 μm,
wherein the molded three-dimensional pattern of the soft cake is complementary to the molded inner surface of the pan and has a molded groove which is in recess relative to said molded face and/or a molded ridge which protrudes relative to said molded face,
wherein the molded face is substantially planar and wherein said molded groove or said molded ridge has a substantially flat portion in a plane parallel to the molded face, the flat portion extended along the groove or ridge with a substantially constant width, measured perpendicular to the length of the groove or ridge across the flat portion, of from less than 4 mm to 0.4 mm, preferably from 1 to 0.4 mm.

In this embodiment, the groove or ridge preferably has a depth measured from the substantially planar molded face to the flat portion of from 1 to 5 mm, more preferably 2 to 4 mm. Preferably the groove or ridge has sides extending between the substantially planar molded face to the flat portion having a substantially constant separation such that the groove forms a channel or the ridge forms a wall. Alternatively the walls may taper to the flat portion; preferably the taper when measured at the molded surface starts from less than twice the width of the flat portion.

A preferred embodiment of the first aspect includes a method for the production of a soft cake having at least a molded face and at least a non-molded face, the molded face having at least one molded three-dimensional pattern,
the method comprising the steps of:
- a) pouring a cake batter suitable for forming a soft cake into a pan, wherein the cake batter has a viscosity of between 500 and 1 Pa·s;
- b) baking said soft cake batter in said pan to form a soft cake; and
- c) removing the soft cake from the pan,
wherein the pan has a molded inner surface for receiving the cake batter and which provides the three dimensional molding pattern of the soft cake, and wherein the molded inner surface of the pan has an arithmetical mean degree of roughness (Ra) of from 0.12 μm to 0.22 μm,
wherein the molded three-dimensional pattern of the soft cake is complementary to the molded inner surface of the pan and has a molded groove which is in recess relative to said molded face and/or a molded ridge which protrudes relative to said molded face,
wherein the molded groove or the molded ridge has a radius of curvature in cross-section perpendicularly across the groove or ridge of from 2 mm to 0.2 mm. By radius of curvature it is meant that a theoretical circle of the above radius would fit within the groove (or within the ridge), simultaneously touching both walls and the base of the groove (or ridge).

Preferably the molded groove or the molded ridge has a substantially constant width matching twice the radius of curvature. Preferably the molded groove or the molded ridge tapers from less than four times the radius of curvature at the molded surface of the soft cake.

Preferably the molded groove or the molded ridge in any of the foregoing embodiments is in the form of letters or numerals (or any ASCII characters) and therefore includes angles and junctions between straight and/or curved lengths of groove or ridge.

According to the second aspect there is provided a soft cake having at least a molded face and at least a non-molded face, the molded face having at least one molded three-dimensional pattern, said three dimensional pattern comprising at least a molded groove which is in recess relative to said molded face and/or a molded ridge which protrudes relative to said molded face, said molded groove and/or molded ridge having a minimum width of less than 4 mm measured across the groove or ridge at the maximum depth or height respectively. This soft cake can be produced according to the method described herein.

The characteristics of the molded groove or ridge are discussed above and apply equally to the second aspect.

Preferably the soft cake has a water activity of from 0.50 to 0.95. More preferably the Aw is from 0.60 to 0.85, more preferably from 0.65 to 0.80, and even more preferably from 0.71 to 0.73 (see Example 5 below). Aw values can for example be measured at 25±0.2° C. with an Aqualab 4TE, or a Novasina. Soft cakes can be characterised by having a relatively high water activity in the above ranges, compared to products such as biscuits which have comparatively low water activities.

Preferably the cake has a density of from 1.3 to 2.0 g/cm$^3$, more preferably from 1.5 to 1.8 g/cm$^3$.

The soft cake is prepared and baked so as to present aerating cavities which provide softness and volume, and therefore good taste and texture, to the cake. Preferably the soft cake has an aerated structure presenting cavities, wherein at least 60% of the cavities have their biggest diameter smaller than the smallest width of the molded groove or the molded ridge. Preferably at least 70%, more preferably at least 80%, yet more preferably at least 90%, and even more preferably at least 95% of the cavities have their biggest diameter smaller than the smallest width of the molded groove or the molded ridge. That is, the aerated structure does not interfere with the definition of the groove or ridge. The cavity size of the aerated structure can be determined by performing a manual count from a cross-section of the finished product.

The soft cake batter of the invention can comprise ingredients conventionally used in soft cake production, preferably chosen in the group consisting of: flours, eggs, egg fractions (e.g.: egg yolk, egg white, egg powder), sugars, salt, water, leavening powder (such as sodium bicarbonate, sodium pyrophosphate acid, citric acid, glucono-delta-lactone and mixtures thereof), flavouring agents (e.g.: natural or artificial fruit flavours, vanilla extract, fruit, cocoa powder, coffee extract, tea extract), colouring agents, fat (e.g.: butter, margarine, vegetable oils, shortening), milk, milk fractions (e.g.: modified or unmodified potato starch, modified or unmodified wheat starch, corn starch, manioc starch), hydrocolloids, emulsifiers (e.g.: mono and diglycerides of fatty acids, propylene glycol esters of fatty acids, lactic acids esters of mono and diglycerides of fatty acids, sodium stearoyl-2-lactylate), polyols (e.g.: glycerol, sorbitol), potassium sorbate, fibres, etc.

The soft bakery product may comprise cereals. These may be in an amount of at least 30 wt %, more preferably at least 35 wt %, still more preferably at least 40 wt %, and preferably at most 80%. The cereals may be provided by flour and/or inclusions.

Suitable flour may include refined flour and/or whole grain flour. In some embodiments, suitable flour may include thermally treated flour. Wholegrain flour is understood to mean flour produced directly or indirectly from cereal whole grains comprising endosperm, bran and germ. Wholegrain flour may also be reconstituted from separate flours made from endosperm, bran and germ respectively in ratios that give the reconstituted wholegrain flour the same composition as wholegrain flour directly produced from grains that still retain bran and germ. Refined flour is understood to mean flour produced from cereal endosperm only.

Preferably, the soft bakery product comprises at least 5 wt % wholegrain cereals, more preferably at least 10 wt %, and most preferably at least 15 wt %. Preferably, the soft bakery product comprises at most 25 wt % wholegrain cereals. At least a portion of the wholegrain cereals may be provided by wholegrain cereal flour. Suitable types of wholegrain flours may include but are not limited to wholegrain wheat flour, wholegrain barley flour, wholegrain rye flour, wholegrain spelt flour, wholegrain buckwheat flour, wholegrain oat flour, wholegrain rice flour, wholegrain maize flour, wholegrain millet flour, wholegrain kamut flour, wholegrain sorghum flour, wholegrain teff flour, wholegrain triticale flour, and pseudocereal flour such as amaranth flour and quinoa flour, and mixtures thereof. Other sources of wholegrain cereals include wholegrain semolina and wholegrain cereal inclusions.

As noted above, preferably, the soft cake batter of the invention comprises at least 10 wt. % of fat, preferably more than 15 wt. % of fat, more preferably more than 20 wt. % of fat. In particular, the soft cake batter can comprise between 10 wt. % and 50 wt. % of fat, preferably between 15 wt. % and 40 wt. % of fat, more preferably between 20 wt. % of fat and 30 wt. % of fat.

The fat of the soft cake batter of the invention can comprise at least one fat selected in the group consisting of oil and butter. Preferably the fat of the soft cake batter consists in oil, butter or a mixture thereof.

By oil, it is herein referred to cooking oil, i.e. to plant, animal, or synthetic fat which is fluid at 15° C. Preferably, the fat of the soft cake batter of the invention comprises plant oil, and yet more preferably vegetable oil, advantageously chosen from the group consisting of olive oil, palm oil, soybean oil, rapeseed oil (canola oil), pumpkin seed oil, corn oil, sunflower oil, safflower oil, peanut oil, grape seed oil, sesame oil, argan oil, rice bran oil. Preferably, the oil of the soft cake batter of the invention comprises rapeseed oil. Preferably, the fat of the soft cake batter of the invention consists of rapeseed oil.

The soft cake batter can in particular comprise between 10 and 30 wt. % of rapeseed oil, preferably between 12 and 20 wt. % of rapeseed oil, and more preferably between 14 and 16 wt. % of rapeseed oil.

By butter, it is herein referred to a dairy product made by churning fresh or fermented cream or milk, to separate the butterfat from the buttermilk. Preferably the butter is made from cow's milk. Preferably, the fat of the soft cake batter of the invention comprises butter made from cow's milk. Preferably, the fat of the soft cake batter of the invention consists in butter made from cow's milk. The soft cake batter can comprise between 0 and 20 wt. % of butter, preferably between 3 and 10 wt. % of butter, and more preferably between 4 and 6 wt. % of butter.

Advantageously, the soft cake batter of the invention can comprise about 15 wt. % of rapeseed oil and 5 wt. % of butter, preferably butter made from cow's milk.

The soft cake batter of the invention can comprise egg white. By "egg white", it is herein referred to chicken egg white. Preferably, the soft cake batter of the invention comprises between 0.5 and 3 wt. % of egg white, preferably between 0.8 and 2.5 wt. % of egg white, and more preferably between 1 and 2 wt. % of egg white.

The soft cake batter of the invention can comprise low fat milk powder. Preferably, the soft cake batter of the invention comprises between 0.5 and 3 wt. % of low fat milk powder, preferably between 0.8 and 2.5 wt. % of low fat milk powder, and more preferably between 1 and 2 wt. % of low fat milk powder.

Advantageously, the soft cake batter of the invention comprises egg white and low fat milk powder. In particular, the soft cake batter of the invention comprises between 1 and 2 wt. % of egg white and between 0.5 and 3 wt. % of low fat milk powder, and preferably about 1.5 wt. % of egg white and about 0.5 wt. % of low fat milk powder.

The soft cake batter of the invention can comprise hydrocolloids. In particular, said hydrocolloid is guar gum. For example, the soft cake batter of the invention can comprise between 0.01 and 0.30 wt. % of hydrocolloid, preferably between 0.01 and 0.20 wt. % of hydrocolloids and more preferably between 0.05 and 0.10 wt. % of hydrocolloid.

The use of emulsifiers and in particular of unsaturated fatty acids improves the softness of the soft cake. The soft cake batter of the invention can also comprise at least one emulsifier, advantageously chosen in the group consisting of: mono and diglycerides of fatty acids, propylene glycol esters of fatty acids, lactic acids esters of mono and diglycerides of fatty acids, sodium stearoyl-2-lactylate and unsaturated fatty acids. More advantageously, said emulsifier comprises at least unsaturated fatty acids.

Unlike bread, brioche, panettone, pains au lait, pandori, etc. (bread-like baked products), a batter for soft cake advantageously does not present any gluten network. Gluten is a composite of gliadin and glutenin. A gluten network is formed when glutenin molecules cross-link, the cross-linked glutenin is attached to gliadin molecules. In bread-like baked products, the gluten network helps trapping air bubbles, it helps the dough rise high and, in the case of bread-like baked product such as panettone it helps with supporting the fruit pieces. When the batter is baked, the gluten network undergoes denaturation, a phenomenon which contributes to modifying the shape of a product such as bread with time. A soft cake on the other hand presents a texture of crumb being much less elastic than bread or bread-like products. Soft cakes have a long shelf-life in comparison to bread, brioche, panettone, pains au lait, pandori, etc., since their structure does not denature as fast as these other products.

In an embodiment, the method of the invention is for preparing soft cakes which contained a specific filling. The filling of the soft cake can be incorporated therein before baking, for example by successively pouring a first portion of soft cake batter, a portion of filling and a second portion of soft cake batter. This will create a single portion of filling inside the soft cake. More than one portion of filling can be provided into the soft cake by multiplying the steps of successive pouring portions of soft cake batter and portions of filling. In this particular case, more than one type of filling can be used.

The filling can also be provided after baking by injection or spreading. For example, the filling can be injected into the baked soft cake. Another example is to slice the baked soft cake at least into two parts and to spread the filling between the parts. It is also possible to use more than one filling. In an additional example, the filling can just be spread on top of the soft cake.

The filling may be chosen in the group consisting of water-based fillings and fat-based fillings, such as for instance buttercream, citrus (lemon) curd, cream cheese, custard, puddings, ganache, jams and jellies, marzipan, sugar syrups, whipped cream.

DETAILED DESCRIPTION

The soft cake 1 shown in FIG. 1 has the same general rectangular shape of the well-known "Petit-Lu" dry biscuit and has higher thickness (thickness of around 25-30 mm in its medium part). The soft cake 1 is provided with a molded face MS on which is printed as a groove the following three dimensional pattern 2:

"LE
PETIT—LU
MOELLEUX"

Said pattern 2 is printed in the form of hollow grooves forming the letters of the pattern.

The recesses forming said letters have a width, measured across their deepest point (i.e. at their bottom) which can be as small as 0.4 mm and which are, for example, equal to 1 or 2 mm. This dimension is measured perpendicularly to the molded groove or the molded ridge.

The molded face MS also comprises pin grooves 3 forming decoration holes with a small diameter at their bottom, e.g. a diameter at their bottom equal to 0.5 mm (i.e. a width and a length of 0.5 mm).

The sides 4 of the soft cake 1 are also molded. They comprise a succession of molded grooves 4a and molded ridges 4b. The width at the bottom of each molded groove 4a can be as small as 0.5 mm, and are for example equal to 0.4-0.5 mm.

The edges 5 of the soft cake are also molded with a rounded shape, evoking the well-known edge shape of the "Petit Lu" biscuits.

Figure 2:
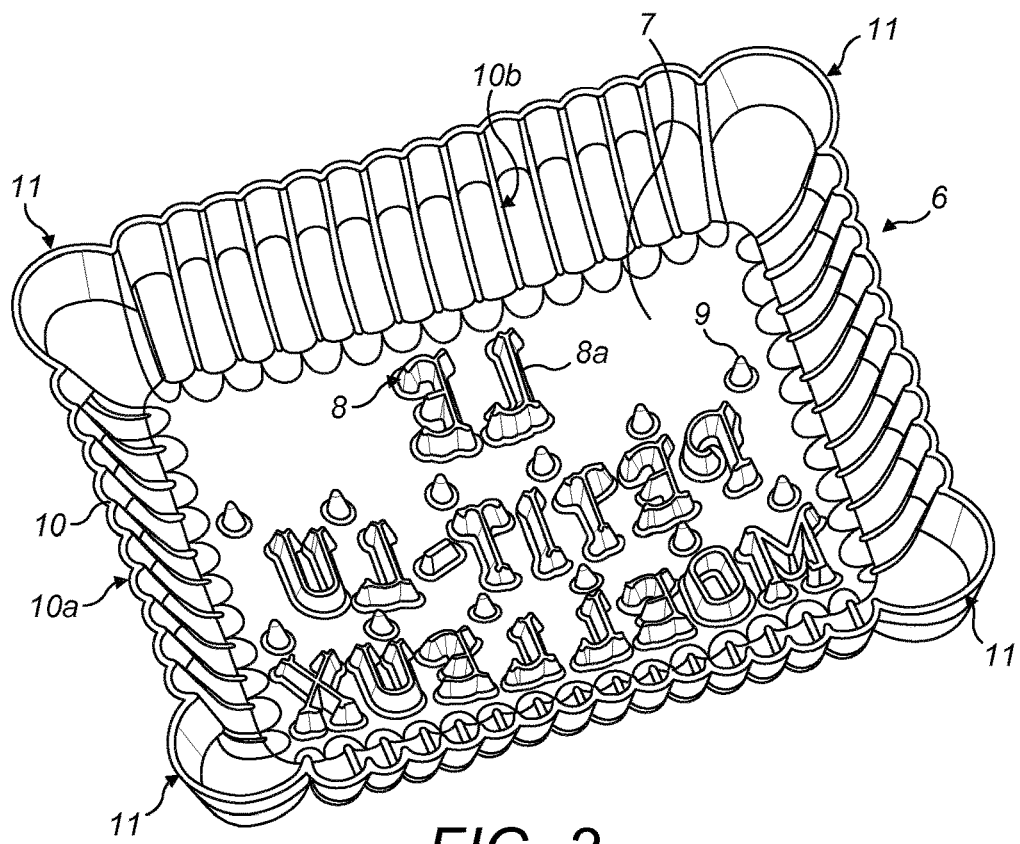
FIG. 2 is a view of a molding pan for suitable for the baking of the soft cake of FIG. 1.

The soft cakes are baked in a molding pan 6 as represented on FIG. 2. Said molding pan is an open pan in the form of a cavity having an internal face bearing molded three dimensional pattern which are the counterform corresponding to the patterns and shapes of soft cake 1. In particular, this molding pan 6 has a general rectangular form with a bottom surface 7 having a three dimensional ridge pattern 8 which is the counterpart of pattern 2 on the soft cake.

The ridges 8a which form pattern 8 present sections as represented on FIG. 3 with a generally trapezoidal form having a small base of a width W of 1 or 2 mm. The radius R between said small base and the edge faces of the trapezoidal form is for example of 1 mm. Frustoconical pins 9 are also provided to provide the counterprint of holes 3 in the soft cake. Said pins 9 have a diameter of 0.5 mm at their top On its sides 10, the pan comprises a three dimensional counterform decoration with grooves 10a and ridges 10b, the ridges 10b having a section similar to that represented on FIG. 3 and corresponding to the grooves 4b of the soft cake 1, whereas the grooves 10a correspond to the ridges 4a of said soft cake 1.

Rounded-edge shapes 11 are also provided at the edges of the pan which correspond to the rounded edges 5 of the soft cake.

The pan 6 can be made out of Liquid Silicone Rubber (LSR) which complies with the food-processing industry requirements. It can also be made of metal or plastic. In particular, said pan 6 can be made of metal in its outer surface and of silicone in its inner surface (see Example 1 below).

Said pan 6 can be made by injection. The injection method allows any design for the pan. It preferably has a thickness of less than 1 mm, preferably of less than 0.8 mm, more preferably of less than 0.7 mm and even more preferably of equal to or less than 0.5 mm (see Example 2 below). Reducing the thickness of the pan appears to permit improved heat exchange during the cooking.

Pan 6 further presents at least one rough inner surface. For example, it presents a roughness on the whole inner surface thereof. The rough inner surface may be obtained with a sanded matrix or a sanded punch.

This rough inner surface permits a homogeneous distribution of the greasing agent. The use of a greasing agent facilitates the turning out of the soft cakes. The degree of roughness of the inner surface of pan 6 can be comprised between VDI 2 and VDI 7, preferably between VDI 3 and VDI 6, more preferably between VDI 4 and VDI 5. VDI can be measured by Tesatool—Rugotest Configuration 81.112344 (tesatool.com/pdf_files/catalog_surface.pdf). The roughness in VDI corresponds to $20*\lg(10*Ra)$ and the table I below shows the equivalence between VDI and Ra.

TABLE I

| VDI3400 0-45 | Ra = AA = CLA (μm) | (μinch) | N3-N10 | ISO1302 Rt (μm) |
|---|---|---|---|---|
| 0 | 0.1 | 4 | N3 | |
| 1 | 0.11 | 4.4 | | |
| 2 | 0.12 | 4.8 | | |
| 3 | 0.14 | 5.6 | | |
| 4 | 0.16 | 6.4 | | |
| 5 | 0.18 | 7.2 | N4 | |
| 6 | 0.2 | 8 | | |
| 7 | 0.22 | 8.8 | | |
| 8 | 0.25 | 10 | | |
| 9 | 0.28 | 11.2 | | |
| 10 | 0.32 | 12.8 | | |
| 11 | 0.35 | 14 | N5 | |
| 12 | 0.4 | 16 | | 1.6 |
| 13 | 0.45 | 18 | | |
| 14 | 0.5 | 20 | | |
| 15 | 0.56 | 22.4 | | 3.2 |
| 16 | 0.63 | 25.2 | | |
| 17 | 0.7 | 28 | | |
| 18 | 0.8 | 32 | N6 | 5 |
| 19 | 0.9 | 36 | | |
| 20 | 1 | 40 | | |
| 21 | 1.12 | 44.8 | | 7.5 |
| 22 | 1.26 | 50.4 | | |
| 23 | 1.4 | 56 | | |
| 24 | 1.62 | 63 | | 12 |
| 25 | 1.8 | 72 | N7 | |
| 26 | 2 | 80 | | |
| 27 | 2.2 | 88 | | 16 |
| 28 | 2.5 | 100 | | |
| 29 | 2.8 | 112 | | |
| 30 | 3.2 | 125 | N8 | 20 |
| 31 | 3.5 | 140 | | |
| 32 | 4 | 160 | | |
| 33 | 4.5 | 180 | | 25 |
| 34 | 5 | 200 | | |
| 35 | 5.6 | 224 | | |
| 36 | 6.3 | 250 | N9 | 37 |
| 37 | 7 | 280 | | |
| 38 | 8 | 320 | | |
| 39 | 9 | 360 | | 46 |
| 40 | 10 | 100 | | |
| 41 | 11.2 | 448 | | |
| 42 | 12.6 | 500 | N10 | 60 |
| 43 | 14 | 560 | | |
| 44 | 16 | 640 | | |
| 45 | 18 | 760 | | 85 |

A degree roughness of comprised between VDI 3 and VDI 6 corresponds to Ra comprised between 0.14 and 0.20 μm.

Figure 4:
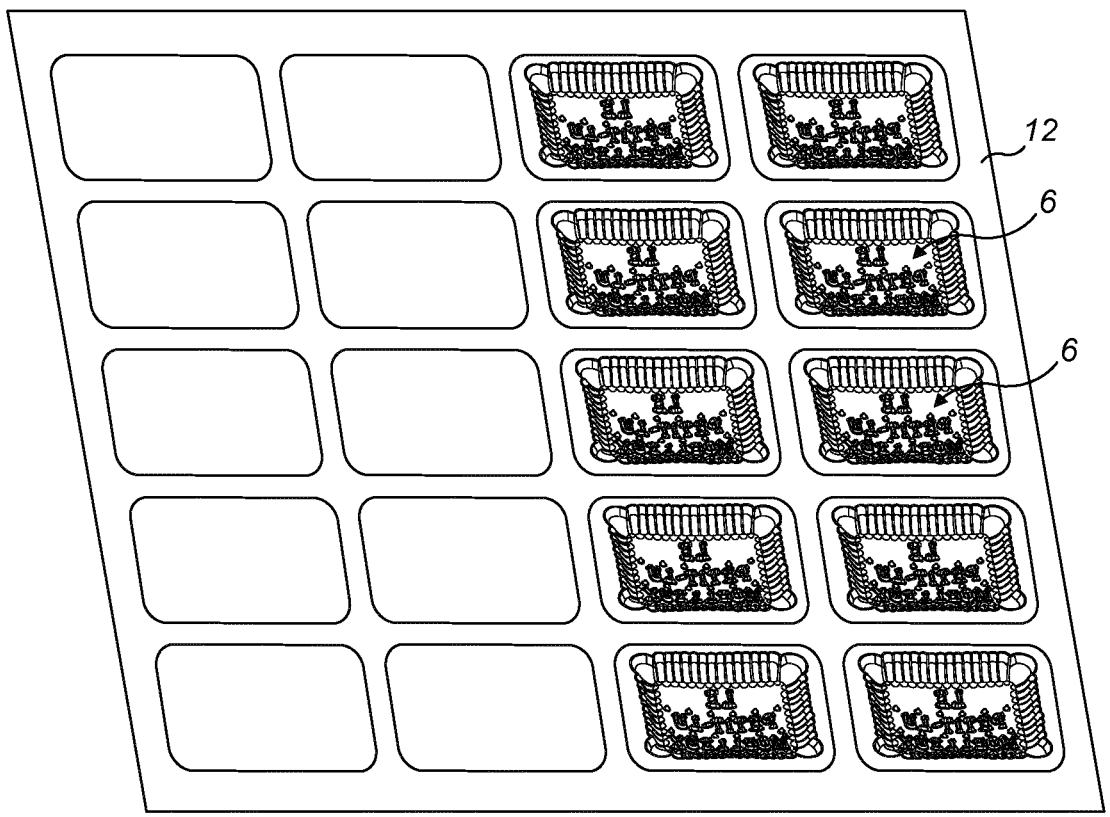
FIG. 4 is a general overview of a plate receiving a plurality of molding pans for the baking of a soft cake as described herein.

As illustrated on FIG. 4, a plurality of silicone pans 6 can be put in place in parallel on a supporting metal cooktop plate 12 for simultaneous baking of a plurality of soft cakes 1. The use of individual pans on a metallic support permits to overcome the problem of deformation which was observed when a too big plastic cooktop is used. For example, a deformation is observed when a cooktop of 20×30 cm is used.

EXAMPLES

The invention will now be demonstrated with reference to the following non-limiting examples.

Example 1

This Example relates to the optimization of the type of pan and of the use of greasing agent.

Several pans were tested to obtain a soft cake with molded three dimensional pattern. Pans made from embossed sheet of steel, wherein the definition of the pan is limited to details which cannot be less than 4 mm, were not used. Plastic and silicon pans were tested with and without greasing agents.

The recipe referenced as TEST 1 was used. It comprises 20% Flour, 20% Eggs, 20% Sugar, 20% Fat, 20% other products.

The results are provided in the table below:

| Type of pan | Greasing agent | Results |
|---|---|---|
| Plastic pan | No | Difficult to remove the soft cake from the pan |
| Plastic pan | Yes | Not possible to obtain precise details of the soft cake due to the micro frying phenomenon. |
| Silicon pan with a smooth inner surface | No | Difficult to remove the soft cake from the pan |
| Silicon pan with a smooth inner surface | Yes | A lot of greasing agent is necessary to turn out the soft cake |
| Silicon pan with a rough inner surface | No | Soft cake with nice 3D decorations. No problem to remove the soft cake from the pan |

The results show that a soft cake with an attractive molded three dimensional pattern is obtained with a silicon pan with a rough inner surface. With this type of pan, greasing is not necessary.

The inventors have observed that, when the silicon pan with a rough inner surface is used, the products of the cycle n leave a film of greasing agent at the surface of the pan after the removing of the cake from the pan, which allows the products of cycle n+1 to not stick to the pan.

An exemplary pan with a three dimensional pattern is shown in FIG. 2.

Example 2

This example relates to the optimization of the thickness of the pan.

The inventors have tested the importance of the thickness of the silicone pans. Silicone pans having a thickness 1 and 2 mm were tested.

The recipe tested is referenced as TEST 1 (20% Flour, 20% Eggs, 20% Sugar, 20% Fat, 20% others) was used.

The results are provided in the table below:

| Thickness of the pan | Baking |
|---|---|
| 1 mm | Not good compared to the one obtained with a metallic pan |
| 2 mm | Not good compared to the one obtained with a metallic pan |
| 0.5 mm | Comparable to the one obtained with a metallic pan |

Since the pans having a thickness of 1 or 2 mm provide less good results, the inventors have managed to obtain a pan with a thickness of 0.5 mm. It is thus possible to obtain soft cakes as baked as soft cakes baked in a metallic pan.

Example 3

This example relates to the size of the pan.

Different cooktops made of silicon or plastic comprising several individual pans were tested. The results show that with a cooktop of 20×30 cm, a deformation is observed during cooking. This was not the case when several individual silicon or plastic pans were assembled on a metallic cooktop (see FIG. 4).

Example 4

This example relates to a comparison of three cakes obtained with tested recipes with cakes on the market.

The inventors have observed that the denser the baked product is, the better the 3D decoration on the surface of the product is. Nevertheless, a too dense cake will not satisfy the consumer. Several cakes on the market (Product 1, 2, 3, 4, 5, 6 & 7) and three cakes obtained with internal recipes (Test 1.1, 2 & 3) were tested on a panel of consumers for their texture.

The results are indicated in FIG. 5.

Example 5

This example relates to the Water activity (Aw) and humidity of the products, which are found not to be determinant factors.

The products obtained (tests 1 and 2) were compared with some of the cake products already on the market (Products 5, 6 and 7 of example 4) and which are appreciated by the consumers. The water activity (Aw) was measured with a Novasina AW SPRINT at 25° C. and the humidity was measured with a Chopin oven at 102° during 4 hours.

Figure 6A:
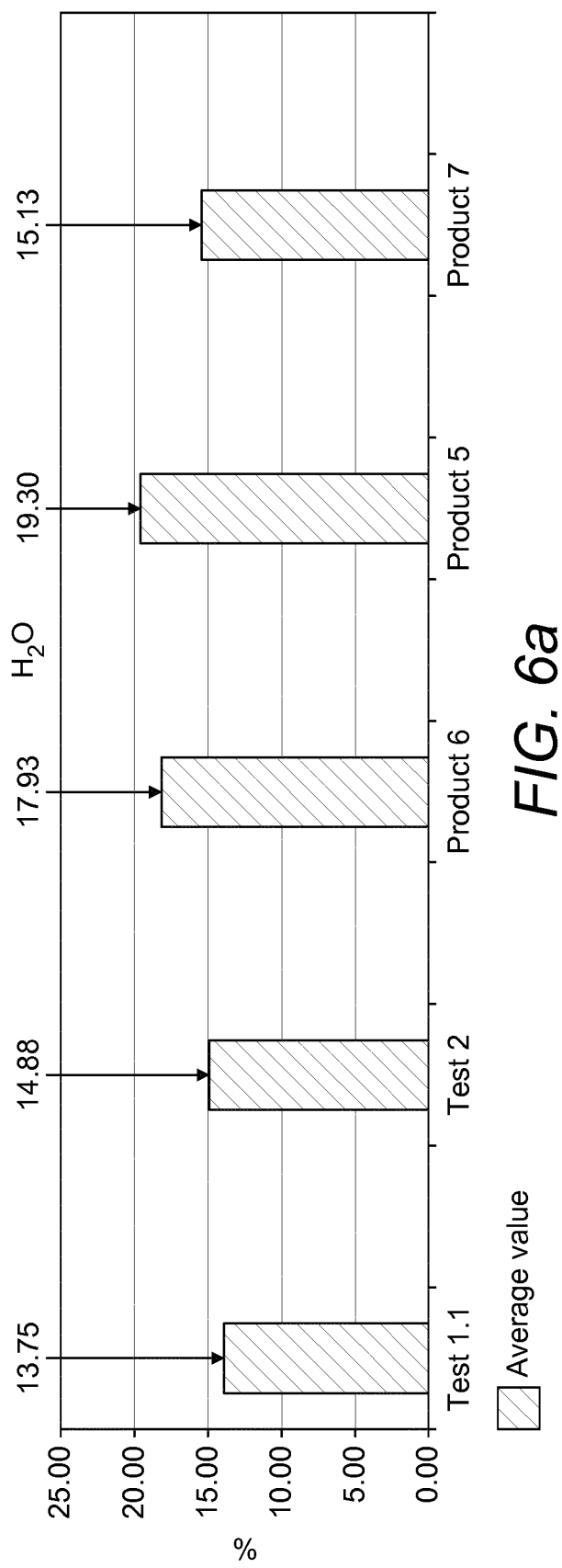
FIGS. 6a and 6b represent the water activity (Aw) and moisture obtained for products according to formula tests 1 and 2 and for three other products already on the market.
Figure 6B:
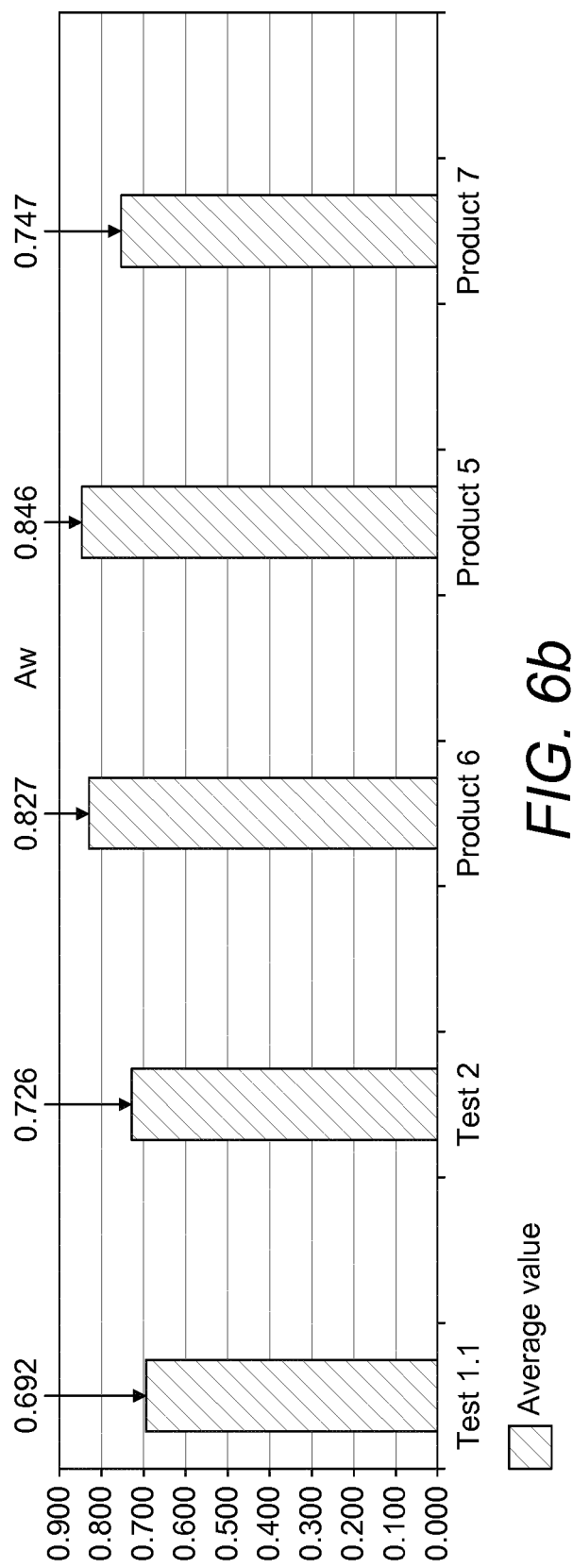

The results are presented in FIG. 6 and show that humidity and water activity are not compulsory to have a good performance of the product, in particular for the product 7.

Example 6

This example relates to optimization of the recipe.

The best performing recipe, Test 1.1, has been optimized.

The results of internal sensory evaluation are presented in the table below:

| Recipe | Density | Cavities* | Texture |
|---|---|---|---|
| Test 1.1 (20% Flour, 20% Eggs, 20% Sugar, 20% Fat, 20% others.) | Good | OK | Soft cake but relatively dry and hard |
| Test 1.2 (test 1 + unsaturated fatty acids) | Good | OK | Good softness |
| Test 1.3 (test 1 + egg white) | High | OK | Good softness but has drying effect in mouth |
| Test 1.4 (test 1 + starch) | High | OK | Dry and hard |
| Test 1.5 (test 1 + low fat milk powder) | Good | OK | Better than Test 1.1, but not as good as test 1.3, with drying effect as well. |

*95% of the cavities have their biggest diameter of less than 4 mm.

Figure 7:
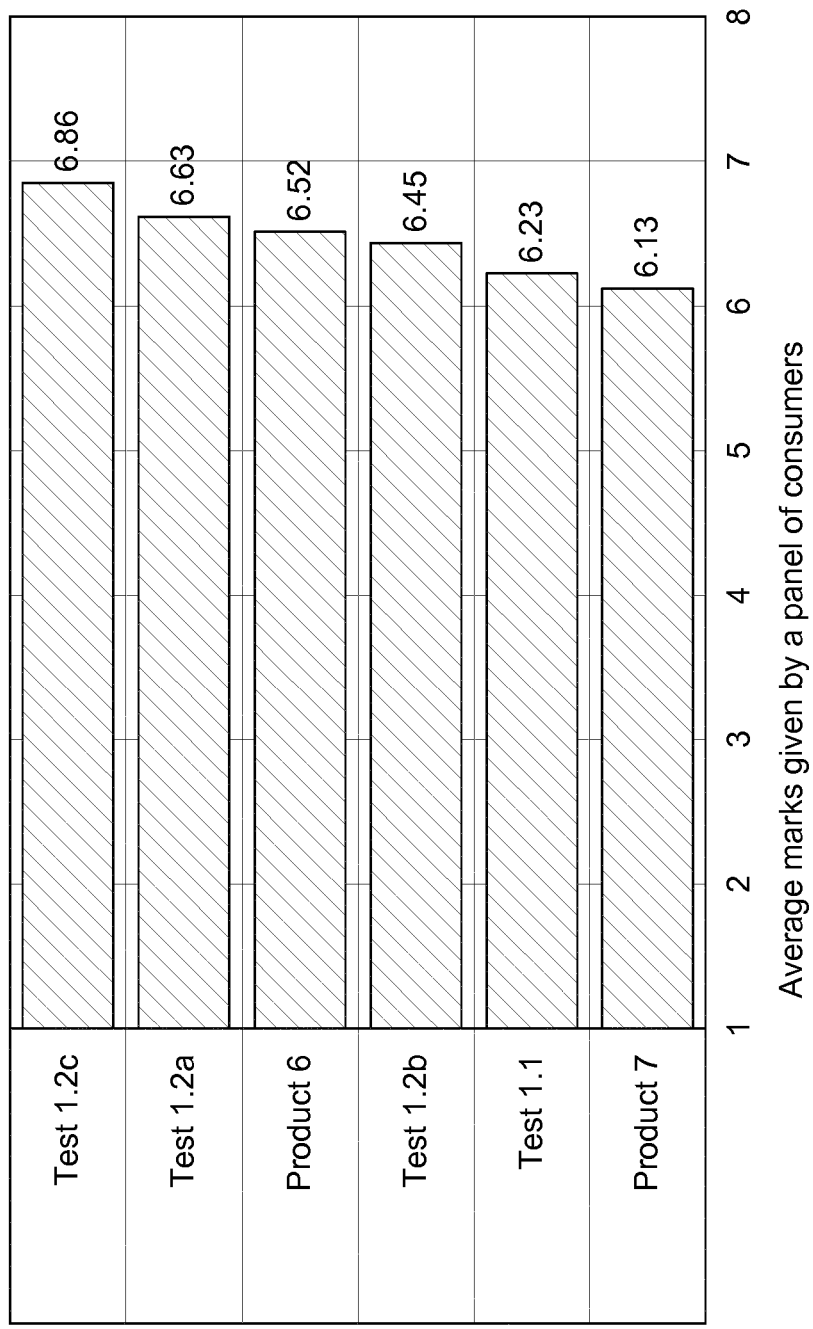
FIG. 7 shows the marks obtained for initial formula test 1.1 and its best optimization 1.2 with the best performing cakes available on the market (Products 6 and 7).

A comparison of the initial formula test 1.1 and its best optimization 1.2 with the best performing cakes available on the market (Products 6 and 7 identified during the first consumer test shown in FIG. 5) is provided in FIG. 7. Of note, 1.2a, 1.2b and 1.2c are aromatic versions of the same test 1.2 recipe.

The results show that the products Tests 1.1 and 1.2 are at least as appreciated by the consumers than the best performing cakes available on the market. Overall, the texture appreciation for the soft cakes of the invention is not significantly different from the one obtained for the product already on the market.

In conclusion, it is thus possible, with the method of the invention, to obtain soft cakes which exhibit very fine details and in particular fine molded three dimensional patterns on at least one of their face, without affecting the texture of the product, and the consumer appreciation thereof.

Unless otherwise stated, all percentages herein are by weight.

Although preferred embodiments of the invention have been described herein in detail, it will be understood by those skilled in the art that variations may be made thereto without departing from the scope of the invention or of the appended claims.

The invention claimed is:

1. A method for the production of a soft cake having at least a molded face and at least a non-molded face; the molded face having at least one molded three-dimensional pattern, the method comprising the steps of:
- a) pouring a cake batter suitable for forming a soft cake into a pan, wherein the cake batter has a viscosity of between 500 and 1 Pa·s;
- b) baking said cake batter in said pan to form a soft cake; and
- c) removing the soft cake from the pan, wherein the pan has a molded inner surface for receiving the cake batter and which provides the at least one three-dimensional molding pattern of the soft cake, and wherein the molded inner surface of the pan has an arithmetical mean degree of roughness (Ra) of from 0.12 μm to 0.22 μm, wherein the at least one molded three-dimensional pattern of the soft cake is complementary to the molded inner surface of the pan and has a molded groove which is in recess relative to said molded face and/or a molded ridge which protrudes relative to said molded face, wherein at least a portion of said molded groove and/or molded ridge has:

a respective depth and/or height of from 2 mm to 4 mm; and a width of less than 1 mm measured across the groove and/or molded ridge at the maximum depth and/or height respectively.

2. The method according to claim 1, wherein the cake batter has a viscosity of from 150 to 30 Pa·s.

3. The met according to claim 1, wherein the cake batter has a density of from 0.6 to 1.2 g/cm³.

4. The method according to claim 1, wherein the cake batter comprises at least 10 wt. % of fat.

5. The method according to claim 1, wherein the inner surface of the pan has an arithmetical mean degree of roughness (Ra) of from 0.16 μm to 0.18 μm.

6. The method according to claim 1, wherein the method does not involve a step of pre-greasing the inner surface of the pan before the cake hatter is poured into the pan.

7. The method according to claim 1, wherein at least the inner surface of the pan is formed from plastic or silicone.

8. The method according to claim 1, wherein the pan has a wall-thickness of less than 1 mm.

9. The method according to claim 1, wherein said molded groove and/or molded ridge has a substantially constant depth.

10. The method of according to claim 4, wherein the cake batter comprises at least 15 wt. % of fat.

11. The method of according to claim 10, wherein the cake batter comprises at least 20 wt. % of fat.

12. The method according to claim 7, wherein at least the inner surface of the pan is formed from silicone.

13. The method according to claim 8, wherein the pan has a wall-thickness of 0.5 mm.

14. The method according to claim 1, wherein at least a portion of said molded groove and/or molded ridge has a width of 0.5 mm.

15. The method according to claim 9, wherein said molded groove and/or molded ridge extends over a length of at least 5 mm.

* * * * *